(12) United States Patent
Kung

(10) Patent No.: US 6,584,328 B1
(45) Date of Patent: Jun. 24, 2003

(54) WIRELESS COMMUNICATION SYSTEM THAT USES KEYWORDS TO FIND AND DISPLAY MAP GRAPHIC DATA

(75) Inventor: Shao-Tsu Kung, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/479,658

(22) Filed: Jan. 10, 2000

(51) Int. Cl.$^7$ .............................. H04B 1/38; G06F 15/16
(52) U.S. Cl. ...................... 455/566; 455/517; 455/414; 701/200; 707/3; 709/219; 340/995
(58) Field of Search .................... 455/566, 517, 455/575, 550, 414, 456, 457, 344, 345; 701/200, 207, 208, 210, 209; 709/217, 218, 219; 342/357.13, 357.1, 357.09; 340/7.51, 7.55, 7.56, 989, 990, 995; 707/1, 3, 4

(56) References Cited

U.S. PATENT DOCUMENTS

| | | | | |
|---|---|---|---|---|
| 5,543,789 | A | * 8/1996 | Behr et al. | 340/995 |
| 5,699,255 | A | * 12/1997 | Ellis et al. | 340/995 |
| 5,941,930 | A | * 8/1999 | Morimoto et al. | 709/208 |
| 6,122,520 | A | * 9/2000 | Want et al. | 455/456 |
| 6,133,853 | A | * 10/2000 | Obradovich et al. | 340/995 |
| 6,148,261 | A | * 11/2000 | Obradovich et al. | 701/208 |
| 6,381,603 | B1 | * 4/2002 | Chan et al. | 701/207 |
| 6,487,495 | B1 | * 11/2002 | Gale et al. | 701/209 |
| 2001/0027375 | A1 | * 10/2001 | Machida et al. | 701/209 |
| 2002/0049742 | A1 | * 4/2002 | Chan et al. | 707/1 |

* cited by examiner

*Primary Examiner*—William Trost
*Assistant Examiner*—Rafael Perez-Gutierrez
(74) *Attorney, Agent, or Firm*—Winston Hsu

(57) ABSTRACT

A wireless communication system comprises a wireless handset, a base station comprising an antenna, and a communication server. The wireless handset comprises a key circuit for inputting telephone numbers or key data, a radio frequency (RF) communication circuit for receiving and transmitting wireless signals, a liquid crystal display (LCD) panel for displaying text or images, and a processor for controlling the operations of the wireless handset. The communication server comprises a memory, and a processor. The memory comprises a map database for storing map graphic data, a keyword data file comprising a plurality of keywords and map coordinates corresponding to the keywords, and a searching program for searching the keyword data file for a target keyword to find the target map coordinate that corresponds to the target keyword and then searching the map database using the target map coordinate to find the target map graphic data that corresponds to the target map coordinate. When a user uses the key circuit to input a target keyword, the wireless handset will use the RF communication circuit to transmit the target keyword to the communication server through the base station. The searching program will find the target map graphic data and transmit the target map graphic data to the wireless handset. The wireless handset will then display the target map graphic data onto the liquid crystal display panel.

5 Claims, 2 Drawing Sheets

WIRELESS COMMUNICATION SYSTEM THAT USES KEYWORDS TO FIND AND DISPLAY MAP GRAPHIC DATA

BACKGROUND OF THE INVENTION

1. Field of the Invention

The invention relates to a wireless communication system, and more particularly, to a wireless communication system that uses keywords to find and display map graphic data.

2. Description of the Prior Art

The past few years have shown enormous growth in the number and popularity of wireless handsets. There is a continuing trend in the industry to use these handsets as not only communication devices but also as on-demand information servers.

When a user wishes to visit a new place, such as a restaurant or an office complex, the user must know the address of the place and find his or her way to the place according to the address. If the user is unfamiliar with the neighborhood, then he or she must turn to a map for assistance. It is not uncommon, however, for the data provided by the map to be limited, incomplete or simply out of date. Such problems can be a great annoyance to the user.

SUMMARY OF THE INVENTION

It is therefore a primary objective of the present invention to provide a wireless communication system that uses keywords to find and display map graphic data.

Briefly, in a preferred embodiment, the present invention provides a wireless communication system comprising:

a wireless handset comprising:
- a key circuit for inputting telephone numbers or key data;
- a radio frequency (RF) communication circuit for receiving and transmitting wireless signals;
- a liquid crystal display (LCD) panel for displaying text or images; and
- a processor for controlling the operations of the wireless handset;

a base station comprising an antenna for establishing wireless communications between the base station and the wireless handset; and a communication server connected to the base station comprising:
- a memory comprising:
  - a map database for storing map graphic data;
  - a keyword data file comprising a plurality of keywords and map coordinates corresponding to the keywords; and
  - a searching program for searching the keyword data file for a target keyword to find the target map coordinate that corresponds to the target keyword and then searching the map database using the target map coordinate to find the target map graphic data that corresponds to the target map coordinate; and
- a processor for executing the searching program;

wherein when a user uses the key circuit to input a target keyword, the processor of the wireless handset will use the RF communication circuit to transmit the target keyword to the communication server through the base station, the searching program of the communication server will find the target map graphic data that corresponds to the target keyword and transmit the target map graphic data to the wireless handset, and the processor of the wireless handset will display the target map graphic data on the liquid crystal display panel.

It is an advantage of the present invention that the user can use the wireless handset of the wireless communication system according to the present invention to input a telephone number to find corresponding map graphic data and obtain detailed and up-to-date map information without using a hardcopy map.

These and other objects and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

To increase the popularity of wireless handsets, the present invention relates to a wireless handset that uses a telephone number to obtain corresponding map graphic data. When a user wishes to visit an unfamiliar location, the user can input the location's telephone number into the wireless handset to find corresponding map graphic data. The map data will be shown on the display of the wireless handset. Hence, the user will no longer need to carry hardcopy maps. The map graphic data shown to the user will provide detailed and up-to-date map information.

Figure 1:
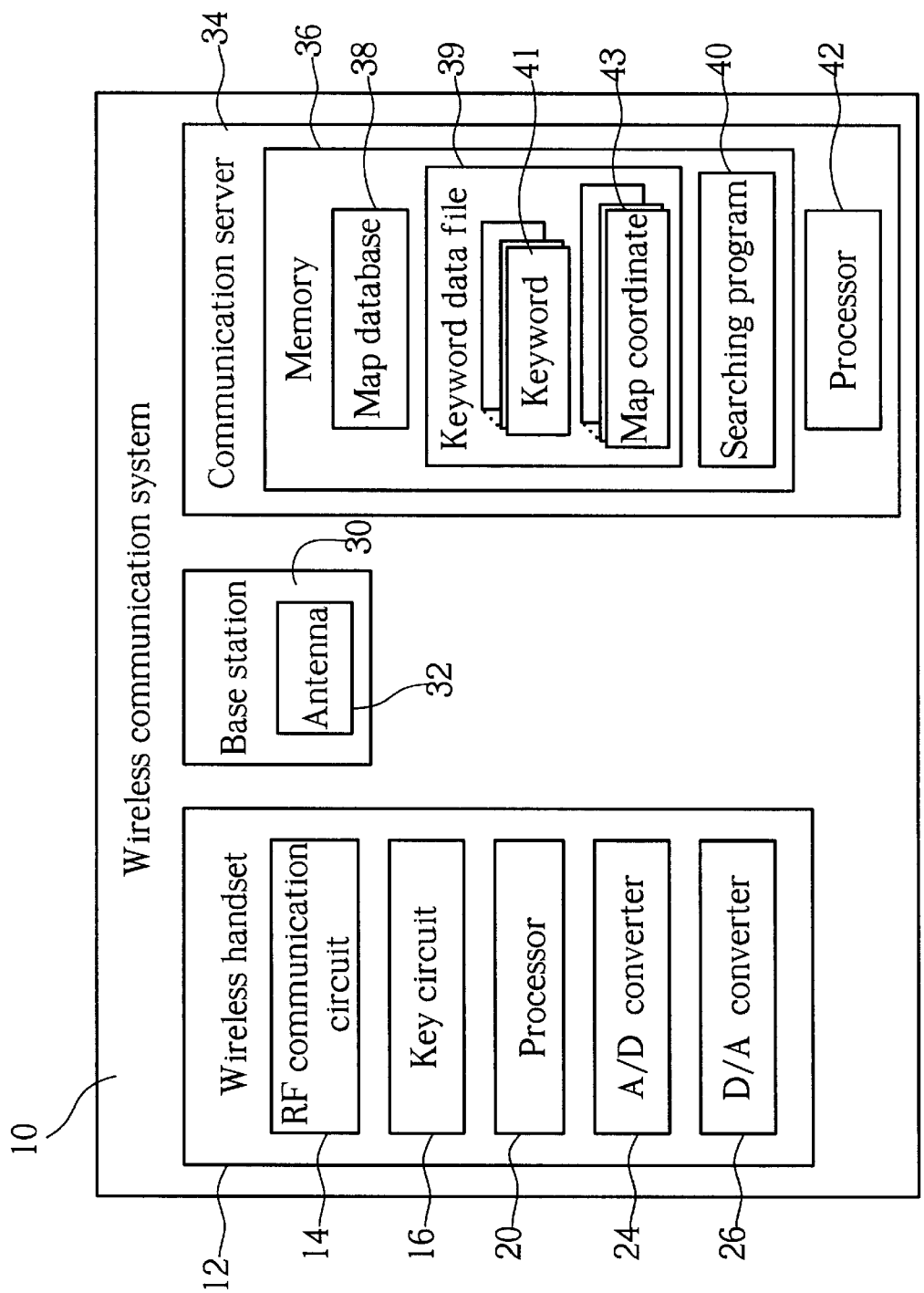
FIG. 1 is a functional block diagram of a wireless communication system according to the present invention.
Figure 2:
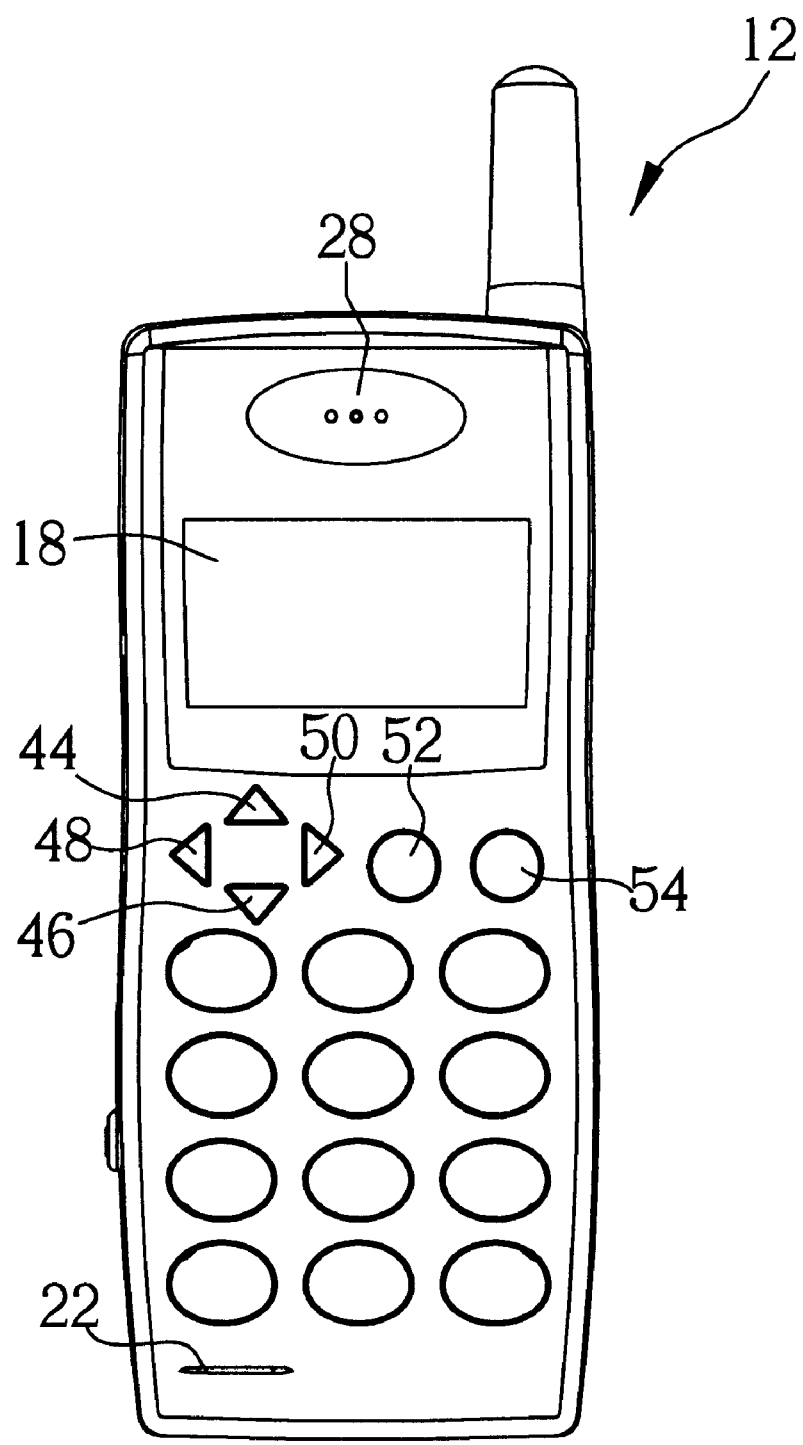
FIG. 2 is a perspective diagram of the wireless handset in FIG. 1.

Please refer to FIG. 1 and FIG. 2. FIG. 1 is a functional block diagram of a wireless communication system 10 according to the present invention. FIG. 2 is a perspective diagram of the wireless handset 12 in FIG. 1. The wireless communication system 10 comprises a wireless handset 12, a base station 30 comprising an antenna 32 for establishing wireless communications between the base station 30 and the wireless handset 12, and a communication server 34 connected to the base station.

The wireless handset 12 comprises a key circuit 16 for inputting telephone numbers or key data, a radio frequency (RF) communication circuit 14 for receiving and transmitting wireless signals, a liquid crystal display (LCD) panel 18 (FIG. 2) for displaying text or images, a processor 20 for controlling the operations of the wireless handset 12, a microphone 22 (FIG. 2) for converting an acoustic sound into analog signals, an analog-to-digital (A/D) converter 24 for converting the analog signals into digital signals that are transmitted to the base station 30 through the RF communication circuit 14, a digital-to-analog (D/A) converter 26 for converting the digital signals generated by the RE communication circuit 14 into analog signals, and a speaker 28 (FIG. 2) for converting the analog signals generated by the digital-to-analog converter 26 into an acoustic sound.

The communication server 34 comprises a memory 36, and a processor 42. The memory 36 comprises a map database 38 for storing map graphic data, a keyword data file 39 comprising a plurality of keywords 41 and map coordinates 43 corresponding to the keywords, and a searching program 40 for searching the keyword data file 39 for a target keyword to find the target map coordinate 43 that corresponds to the target keyword. The map database 38 is searched using the target map coordinate 43 to find the target map graphic data that corresponds to the target map coordinate 43. The processor 42 is used for executing the searching program 40.

Each keyword 41 of the keyword data file 39 comprises a telephone number, and the map coordinate 43 corresponding to the keyword 41 is used to look up the map graphic data in the map database 38 that corresponds to the telephone number of the keyword 41.

When a user uses the key circuit 16 to input a target keyword, such as a telephone number, the processor 20 of the wireless handset 12 will use the RF communication circuit 14 to transmit the target keyword to the communication server 34 through the base station 30. The searching program 40 of the communication server 34 will find the target map graphic data that corresponds to the target keyword and transmit the target map graphic data to the wireless handset 12 through the base station 30. The processor 20 of the wireless handset 12 will then display the target map graphic data on the liquid crystal display panel 18.

Each keyword 41 can further comprise an address, the name of a person, or the name of a company. Hence, the user can use the wireless handset 12 to input an address or a name to find and display map graphic data.

Please refer to FIG. 2. The wireless handset 12 further comprises move-up, move-down, move-left, and move-right scrolling keys 44, 46, 48, 50 for generating corresponding move-up, move-down, move-left, and move-right scrolling key signals. When the communication server 34 receives any of the scrolling key signals transmitted from the wireless handset 12, the communication server 34 will transmit corresponding map graphic data to the wireless handset 12. The processor 20 of the wireless handset 12 will display the new map graphic data on the liquid crystal display panel 18.

For example, when the user presses the move-up scrolling key 44, the wireless handset 12 will transmit a corresponding move-up scrolling key signal to the communication server 34. When the communication server 34 receives the move-up scrolling key signal transmitted from the wireless handset 12, the communication server 34 will transmit corresponding map graphic data to the wireless handset 12 according to the move-up scrolling key signal. The map graphic data transmitted from the communication server 34 shows the shift of the wireless handset 12 in a different map. In this manner, the user may scroll the old displayed map graphic data up, down, left or right to see new additional map graphic data beyond the edges of the old map graphic data.

The wireless handset 12 further comprises a zoom-in key 52 for generating a zoom-in signal, and a zoom-out key 54 for generating a zoom-out signal. When the user presses the zoom-in key 52, the wireless handset 12 will transmit a corresponding zoom-in signal to the communication server 34. When the communication server 34 receives the zoom-in signal transmitted from the wireless handset 12, the communication server 34 will transmit corresponding map graphic data to the wireless handset 12 according to the zoom-in signal. A specific area in the map shown by the map graphic data is zoomed in according to the user's choice to provide a more detailed map. When the user presses the zoom-out key 54, the wireless handset 12 will transmit a corresponding zoom-out signal to the communication server 34. When the communication server 34 receives the zoom-out signal transmitted from the wireless handset 12, the communication server 34 will transmit corresponding map graphic data to the wireless handset 12 according to the zoom-out signal.

Therefore, the user can use the wireless handset 12 of the wireless communication system 10 according to the present invention to input a telephone number, or a name, to find corresponding map graphic data and obtain detailed information without using a hardcopy map.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless communication system comprising:
   a wireless handset comprising:
      a key circuit for inputting telephone numbers or key data;
      a radio frequency (RF) communication circuit for receiving and transmitting wireless signals;
      a liquid crystal display (LCD) panel for displaying text or images; and
      a processor for controlling the operations of the wireless handset;
   a base station comprising an antenna for establishing wireless communications between the base station and the wireless handset; and
   a communication server connected to the base station comprising:
      a memory comprising:
         a map database for storing map graphic data;
         a keyword data file comprising a plurality of keywords and map coordinates corresponding to the keywords; and
         a searching program for searching the keyword data file for a target keyword to find the target map coordinate that corresponds to the target keyword and then searching the map database using the target map coordinate to find the target map graphic data that corresponds to the target map coordinate; and
      a processor for executing the searching program;
   wherein when a user uses the key circuit to input a target keyword, the processor of the wireless handset will use the RF communication circuit to transmit the target keyword to the communication server through the base station, the searching program of the communication server will find the target map graphic data that corresponds to the target keyword and transmit the target map graphic data to the wireless handset, and the processor of the wireless handset will display the target map graphic data on the liquid crystal display panel.

2. The wireless communication system of claim 1 wherein the wireless handset further comprises:
   a microphone for converting an acoustic sound into analog signals;
   an analog-to-digital (A/D) converter for converting the analog signals into digital signals that are transmitted to the base station through the RF communication circuit;
   a digital-to-analog (D/A) converter for converting the digital signals generated by the RF communication circuit into analog signals; and
   a speaker for converting the analog signals generated by the digital-to-analog converter into an acoustic sound.

3. The wireless communication system of claim 1 wherein the key circuit comprises a plurality of scrolling keys for generating corresponding scrolling key signals for scrolling the image displayed on the LCD panel in various directions; wherein when the communication server receives any of the scrolling key signals transmitted from the wireless handset, the communication server will transmit corresponding map graphic data to the wireless handset, and the processor of the wireless handset will display the new map graphic data on the liquid crystal display panel.

4. The wireless communication system of claim 1 wherein the key circuit further comprises a zoom-in key for generating a zoom-in signal, and a zoom-out key for generating a zoom-out signal; wherein when the processor of the wireless handset receives the zoom-in or zoom-out signal, the processor will process the map graphic data transmitted from the communication server according to the zoom-in or zoom-out to shrink or enlarge the image displayed on the LCD panel.

5. The wireless communication system of claim 1 wherein each keyword of the keyword data file comprises a telephone number, and the map coordinate corresponding to the keyword is used to look up the map graphic data in the map database that corresponds to the telephone number of the keyword.

* * * * *